June 26, 1956 — L. LAPEKAS — 2,751,817
REARVIEW MIRROR CONSTRUCTION
Filed June 4, 1953
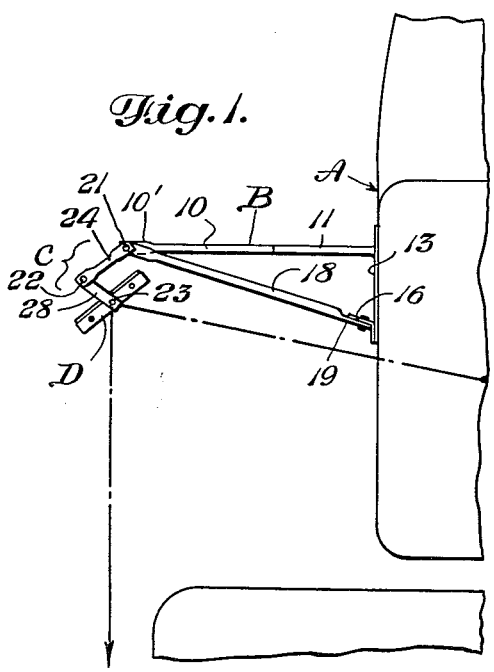
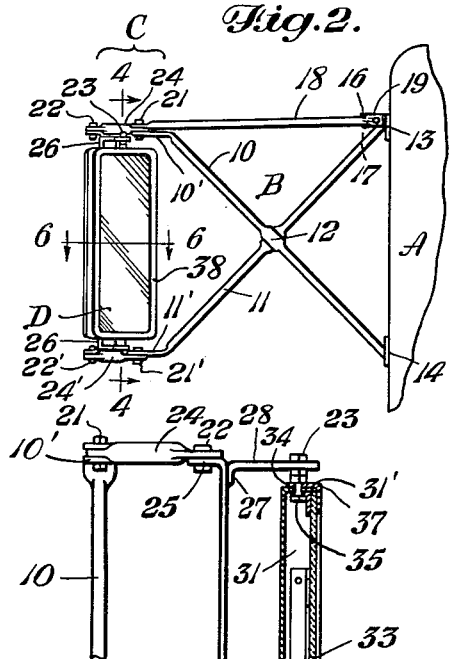
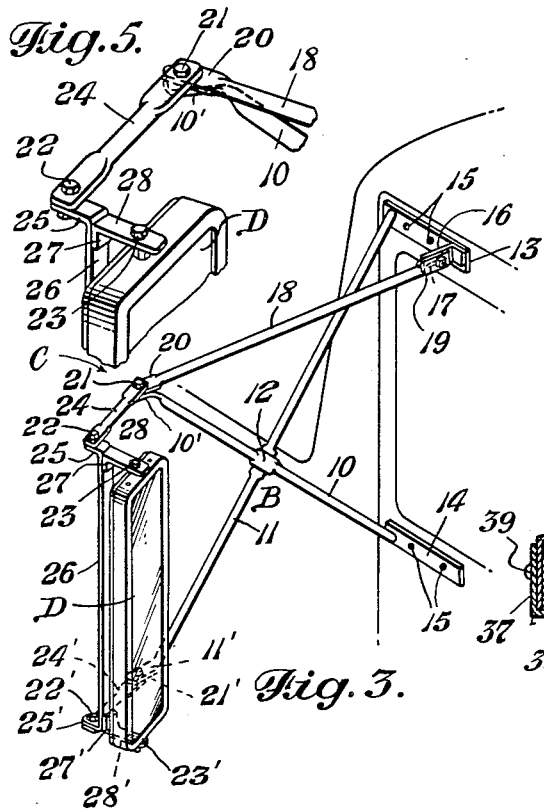
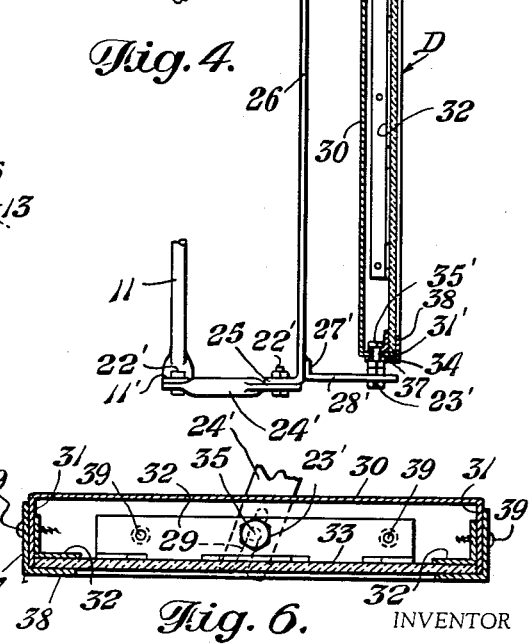
INVENTOR
Lucas Lapekas,
BY Alvin Browdy
ATTORNEY United States Patent Office 2,751,817
Patented June 26, 1956

2,751,817
REARVIEW MIRROR CONSTRUCTION

Lucas Lapekas, Kalamazoo, Mich., assignor to See-Mor Truck Mirror Corporation, Kalamazoo, Mich., a corporation of Michigan Application June 4, 1953, Serial No. 359,540

8 Claims. (Cl. 88—93)

This invention relates to rear view mirrors, and more particularly to a rear view mirror assembly and a bracket for mounting it, of the general type used on commercial vehicles, such as trucks, buses, and the like, to enable the driver to view a part of the road to the rear of the vehicle.

Many such vehicles are provided with bodies that are mounted for relative movement on the vehicle chassis, and as the rear view mirror must be mounted in relatively fixed relation to the driver's seat, except for final adjustments, it has become common practice to mount the rear view mirror on the exterior of the left and right side wall of the driver's cab. This makes it necessary on many trucks to support the mirror on the outer end of an arm mounted directly upon the cab wall. The load carrying bodies of a great many commercial trucks and vehicles are considerably wider than their respective driver's cabs. Therefore to be effective, the mirror must be positioned beyond the outermost wall of the truck body in order that the driver may have clear unobstructed vision rearwardly of the truck. The mountings heretofore proposed have not been sufficiently rugged and sturdy to stand up under the rough usage to which the modern truck is subjected. The ever increasing demands placed upon the modern and heavy motor trucks in the varied and numerous uses to which they are put necessitate a sturdy and substantial mounting for the rear view mirror which will withstand the excessive jarring and rough travelling of these motor vehicles to retain their adjusted positions at all times.

It is an object of the present invention to provide a rear view mirror assembly with an improved mounting which is rugged and readily adaptable for use on heavy motor trucks.

It is a further object of the invention to provide an improved mounting for rear view mirrors permitting both lateral and longitudinal adjustment of the mirror with respect to the mounting.

It is a still further object of the invention to provide a rear view mirror mounting bracket and mirror support having means for conveniently securing it to a fixed support such as the side wall of a driver's cab, said support having improved longitudinal adjustment features to facilitate accurately positioning the mirror beyond the outermost side wall of the truck body.

A still further object of the invention is to provide a rear view mirror mounting bracket whereby the bracket is so ruggedly constructed that the mirror is not likely to vibrate, even when travelling over rough roads and whereby the driver of the vehicle may be assured at all times that the mirror bracket will retain the mirror in its adjusted position at all times.

These and other objects of the invention and the means for their attainment will be more apparent from the following description taken in conjunction with the accompanying drawings, wherein:

Fig. 1 is a top plan view showing a portion of a commercial automotive vehicle with the invention embodied thereon;

Fig. 2 is a view looking forwardly from a position rearwardly of the rear view mirror;

Fig. 3 is a perspective view of the invention;

Fig. 4 is an enlarged cross-sectional view along the line 4—4 of Fig. 2;

Fig. 5 is an enlarged fragmentary perspective view of a portion of the mirror and support; and Fig. 6 is an enlarged cross-sectional view along the line 6—6 of Fig. 2.

In the drawings, the driver's cab of the truck is designated as A, the bracket portion as B, the mirror support including the pivots as C, and the rear view mirror as D.

The bracket structure embodies a pair of crossed arms 10 and 11 which may be of tubular construction welded together at an intermediate point 12 near the center of the two arms. The cross arms are mounted in a substantially vertical plane with the inner terminal ends of the arms 10 and 11 secured, as by welding, to the forward ends of a pair of supporting bases 13 and 14 which are attached to the driver's cab A as by bolts 15. The outer terminal ends of the arms 10 and 11 are flattened as shown at 10' and 11'. An angle 16 having an adjustment slot 17 therein is secured as by welding to the rearward portion of the upper supporting base 13. A supporting arm 18, which may be a tubular member, extends outwardly from the vehicle in a substantially horizontal plane. The arm 18 has flattened terminal ends 19 and 20. The inner terminal end 19 is adjustably secured by a bolt and nut to the slot 17 of the angle 16 to provide for horizontal adjustment to and from the vehicle. The outer terminal end 20 is pivotally attached to the upper first pivot point 21. The outer terminal end 10' of one of the cross arms 10 is likewise pivotally attached to the upper first pivot point 21. The outer terminal end 11' of the other cross arm 11 is pivotally attached to the lower first pivot point 21'. Thus, the supporting arm 18 extends substantially horizontally outwardly from the vehicle at an acute angle of about 22½° to the vertical plane of the cross arms 10, 11.

It should be noted that in some cases where the adjustable features are not important, the mirror D can be pivotally attached directly to the first pivot point 21'. However, in the preferred embodiment of the invention, the mirror support structure C is located between the bracket B and the mirror D. The bracket B described above yields a rugged sturdy support capable of withstanding the rough usage to which the vehicle is subjected.

The mirror support C includes three upper pivot points 21, 22 and 23, and three lower pivot points 21', 22' and 23', with each upper pivot point being in vertical alignment with one of the lower pivot points, as is best shown in Fig. 4. The three upper pivot points are located in substantially the same horizontal plane and likewise the three lower pivot points are located in substantially the same horizontal plane, as is best shown in Fig. 4.

Pivot points 21 and 22, and 21' and 22' are each connected by a link 24, 24', respectively. Links 24, 24' may be tubular members provided with flattened ends. The inner end of link 24 is pivotally attached at 21 to the outer terminal end 20 of supporting arm 18 and to the outer terminal end 10' of cross arm 10. The inner end of link 24' is pivotally attached at 21' to the outer terminal end 11' of cross arm 11. The outer ends of links 24, 24' are pivotally attached to the horizontal ends 25, 25' of a vertical connecting member 26. At the upper and lower ends of the connecting member 26 are attached, as by welding, angles 27, 27', each having a horizontal portion 28, 28' adjacent to the horizontal ends 25, 25' of the supporting member and extending in the opposite direction therefrom to the pivot point 23, 23'. The horizontal portion 28' of the lower angle 27' is provided with a slot 29 to permit an angular adjustment of the lower pivot 23' with respect to the upper pivot 23.

The elongated mirror D is pivotally connected between the upper pivot point 23 and the lower pivot point 23' with its longer axis in a vertical position.

The mirror D includes a flat bottomed casing member 30 having integral side walls 31 and end walls 31', with an open top. The side and end walls 31, 31' are provided with angular supports 32 welded thereto and extending inwardly into the casing to form shoulders on which the mirror 33 is supported. Each end wall 31' has an opening 34 therethrough at the center thereof to accommodate a bolt 35, 35' which passes through the horizontal portion 28, 28' of the angle 27, 27' to act as the pivot 23, 23' for the mirror which is free to rotate between the upper pivot 23 and the lower pivot 23'. The mirror 33 may be of plate glass with the usual reflecting coating, and suitable resilient gaskets may be provided on which the mirror rests. A cover member 37 including end and side walls fits over the open top of the casing and retains the mirror in position. The flat portion of the cover member 37 is cut away except for a rim portion 38 about the periphery thereof which rests on the mirror. The cover member 37 may be retained on the casing 30 by means of screws 39 or the like through aligned openings in the side and end walls of the casing and the cover member. The end walls of the cover member are slotted at the center portion to enable the bolts 35 to pass therethrough and permit removal of the cover member without removing the bolts 35.

The construction of the bracket structure including the crossed arms 10 and 11 in a single vertical plane and the supporting arms 18 extending at an acute angle to the crossed arms yields a particularly rigid and sturdy bracket which eliminates vibration and jars.

The three pivot system of mirror support yields a readily adjustable support permitting variance of the angle of the face of the mirror as well as the longitudinal positioning of the mirror with respect to the cab of the truck. Each of the pivot points is provided with a bolt and nut for tightening the lock into position after adjusting. After being locked in position, there is no chance of movement due to vibration. The particular mirror support structure having the upper and lower pivot points is readily connected to the bracket structure with its upper and lower supports to yield a novel combination of elements resulting in an improved rear view mirror assembly.

The drawings illustrate a rear view mirror support adapted to be attached to the left side of the vehicle, however, a similar construction may be used on the right side of the vehicle as well. The elimination of the mirror support structure by mounting the mirror directly onto the bracket has not been illustrated, but is considered to be a part of the invention.

It will be obvious to those skilled in the art that various changes may be made without departing from the spirit of the invention and therefore the invention is not limited to what is shown in the drawings and described in the specification, but only as indicated in the appended claims.

What is claimed is:

1. A rear view mirror assembly for a vehicle, comprising a bracket attached to the vehicle, a mirror, and a mirror support connecting the bracket to the mirror, said bracket including a pair of crossed arms immovably connected together at an intermediate point thereon mounted in a substantially vertical plane, the inner ends of said arms being rigidly attached to said vehicle, and a supporting arm attached at its inner end to said vehicle and at its outer end to the outer end of one of said crossed arms, said supporting arm extending substantially horizontally outwardly from said vehicle at an acute angle to said vertical plane.

2. A rear view mirror assembly in accordance with claim 1, wherein the supporting arm is adjustably attached to the vehicle to provide for horizontal adjustment to and from said vehicle.

3. A rear view mirror assembly in accordance with claim 1, wherein the outer end of said supporting arm is attached to the upper outer end of one of said crossed arms.

4. A rear view mirror assembly in accordance with claim 1, wherein said mirror support includes three upper pivot points and three lower pivot points, each of said upper pivot points being in substantially vertical alignment with one of said lower pivot points, the first pair of said aligned pivot points being located at the outer ends of the crossed arms of said bracket and the last of said aligned pivot points pivotally holding said mirror therebetween to permit angular adjustment of said mirror with respect to said mirror support.

5. A rear view mirror assembly in accordance with claim 4, wherein said upper pivot points are all located in substantially the same horizontal plane.

6. A rear view mirror assembly in accordance with claim 4, wherein said second aligned pivot points are connected by a vertical connecting member.

7. A rear view mirror assembly for a vehicle comprising a bracket attached to the vehicle, said bracket including a pair of crossed arms immovably connected together at an intermediate point thereon mounted in a substantially vertical plane, the inner ends of said arms being rigidly attached to said vehicle, and a supporting arm attached at its inner end to said vehicle and at its outer end to the outer end of one of said crossed arms, said supporting arm extending substantially horizontally outwardly from said vehicle at an acute angle to said vertical plane.

8. A rear view mirror assembly in accordance with claim 7, wherein a mirror is pivotally mounted between the outer ends of the crossed arms.

References Cited in the file of this patent

UNITED STATES PATENTS

| | | |
|---|---|---|
| 1,498,658 | Ibach | June 24, 1924 |
| 1,584,938 | Higbee | May 18, 1926 |
| 1,601,449 | McKelvey | Sept. 28, 1926 |
| 1,774,314 | Braly | Aug. 26, 1930 |
| 2,368,970 | Cook | Feb. 6, 1945 |